June 27, 1961  D. H. LYMBURNER  2,990,020
REAR SUPPORT STRUCTURE
Filed Nov. 17, 1958  2 Sheets-Sheet 1
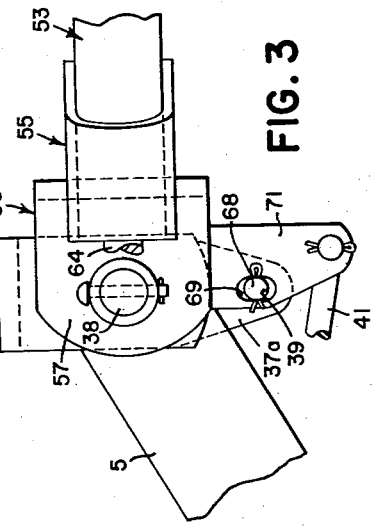
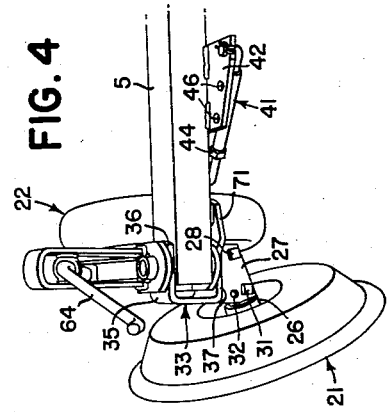
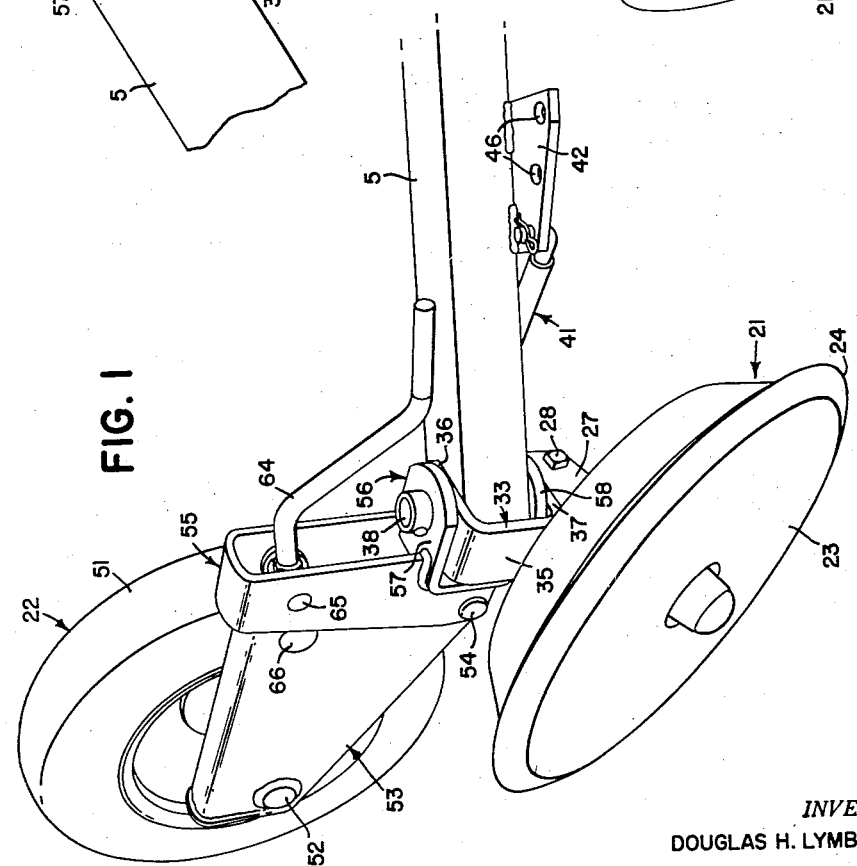
INVENTOR.
DOUGLAS H. LYMBURNER
BY
ATTORNEYS June 27, 1961

D. H. LYMBURNER 2,990,020

REAR SUPPORT STRUCTURE

Filed Nov. 17, 1958

INVENTOR.
DOUGLAS H. LYMBURNER

BY

ATTORNEYS

United States Patent Office 2,990,020
Patented June 27, 1961

2,990,020
REAR SUPPORT STRUCTURE
Douglas H. Lymburner, Welland, Ontario, Canada, assignor to John Deere Plow Company (Limited), Winnipeg, Canada, a corporation of Canada
Filed Nov. 17, 1958, Ser. No. 774,321
7 Claims. (Cl. 172—240)

The present invention relates generally to agricultural implements, and more particularly to ground working implements of the type commonly known as disk tillers. In implements of this kind, a plurality of ground-working disks are carried by a generally diagonally extending main frame, and in operation an implement of this type may work a strip of land of considerable width. In transport, however, it is frequently necessary to pass through relatively narrow spaces, along highways, roads, lanes and the like, in which case it is very desirable to be able to swing the implement around so that the main frame extends generally fore-and aft when the implement is transported from place to place. An implement of this general character is disclosed and claimed in U.S. Patent 2,779,261, issued January 29, 1957, to Northcote et al., and the object and general nature of this invention is the provision of a new and somewhat simplified rear wheel construction for implements of this nature.

Specifically, one feature of this invention is a provision of a rear wheel construction by which means is provided for detachably mounting a rubber tired transport wheel on the support for a laterally inclined rear furrow wheel, which generally is of cast iron and made or provided with a relatively sharp rim or tread section adapted when in operation to obtain a firm grip on the ground to prevent the implement from swinging around laterally. Cast metal wheels of this type are not adapted for transport, except possibly for short distances over dirt roads and the like, and hence some farmers or operators using disk tillers of the type referred to above may frequently require the use of rubber tire transport wheels, whereas other operators using such implements in the less populated territories, where highway or long distance transport is usually not required, would have little use for a rubber tired transport wheel.

Therefore, according to the present invention, it is my purpose to provide a rear wheel construction in which the transport wheel means is so constructed and arranged as to be readily detachable from the rear furrow wheel means, whereby the implement may, for example, be sold with only the conventional cast iron rear furrow wheel, and yet when the user requires a transport wheel means, such need may be met by an auxiliary transport wheel unit that may simply be attached to the usual rear furrow wheel unit without requiring that a special assembly including both a rear furrow wheel and a transport wheel be substituted for and replace the conventional rear furrow wheel.

These and other objects and advantages of my invention will be apparent to those skilled in the art after a consideration of the following detailed description, taken in conjunction with the accompanying drawings in which:

FIG. 1 is a perspective view of the rear portion of a disk tiller, showing the rear end support structure in a normal operating position.

FIG. 3 is an enlarged plan view of the principal rear wheel support parts showing the same in a normal operating position.

FIG. 4 is a view similar to FIG. 1, showing the rear end structure arranged for endwise transport.

Figure 5:
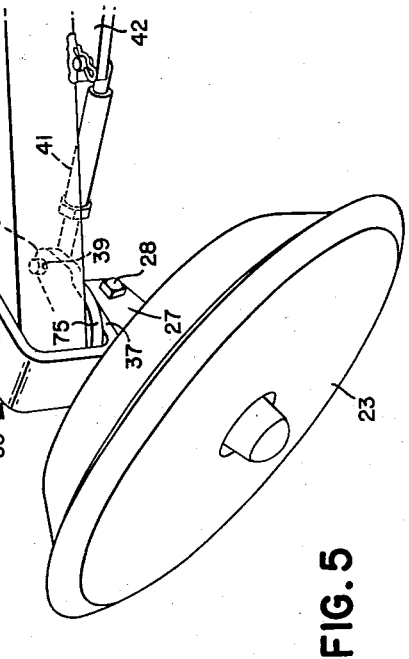
FIG. 5 is a fragmentary perspective view, similar to FIG. 1, showing the rear end arrangement when the auxiliary transport unit is removed.

Referring now more particularly to FIG. 1 a disk tiller in which the principles of the present invention have been incorporated have been indicated in its entirety by the reference numeral 1 and comprises a main frame that in operation extends generally diagonally with respect to the direction of forward travel. The main frame, which may take the form of a relatively large pipe member 2, has a generally rearwardly extending and laterally adjustable bar 5 to the rear portion of which the above-mentioned rear furrow wheel and auxiliary transport wheel are adapted to be connected. Preferably, the rear bar 5 is in the nature of a beam square in section and disposed at its forward end between a pair of upper and lower plates 7 and 8 that are fastened rigidly, as at 9, to the rear end of the main pipe 2. The bar 5 is capable of lateral swinging about a suitable pivot means 11 relative to the plates 7 and 8 and is thus laterally adjustable for different soil conditions, by virtue of a plurality of openings 14 in the upper and lower plates 7 and 8 and a pair of securing means, such as bolts 15.

The bar or rear axle support arm 5 may be disposed in what is usually referred to as a soft ground setting, a hard ground setting, or and medium ground setting. It will also be observed, particularly from FIG. 2, that the vertical dimension of the arm 5 is slightly less than the vertical distance between plates 7 and 8. A spacer plate 17 is apertured to receive the pivot 11 and the bolt 15, and the plate 17 may be disposed in a position either between the bar 5 and the lower plate 8 or between the upper portion of the bar 5 and the upper plate 7, thereby providing a vertical adjustment to accommodate the use of different sizes of disks.

Figure 2:
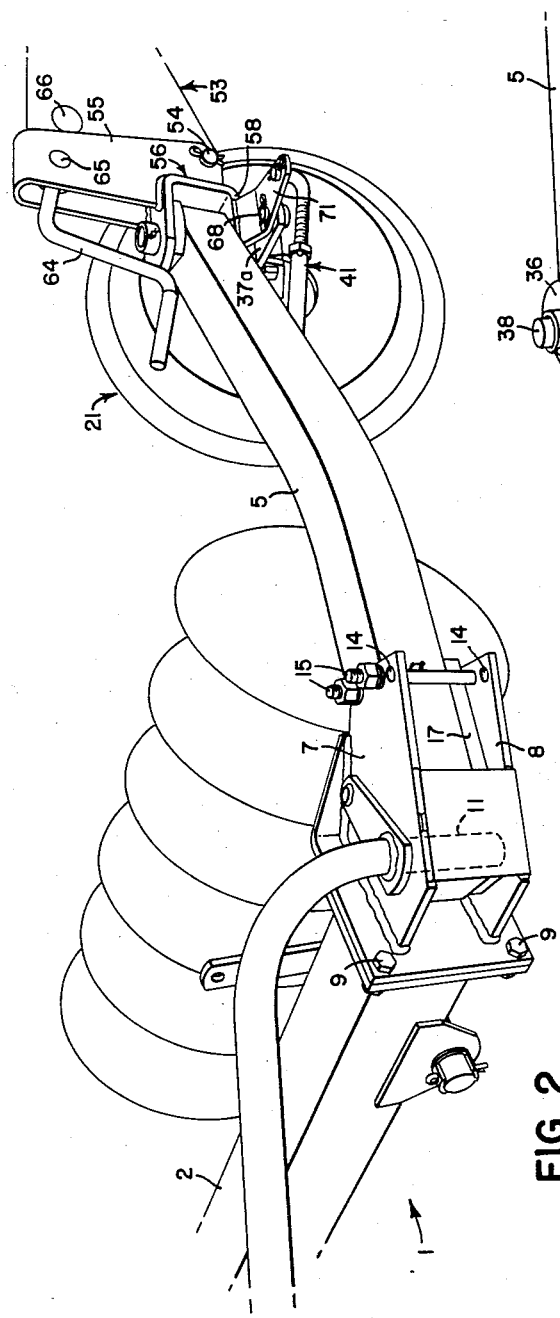
FIG. 2 is a fragmentary perspective view of forward portion of the laterally adjustable arm that carries the rear wheel assemblies.

The rear wheel construction, with which the present invention is more particularly concerned, is best shown in FIGS. 1 and 2 and comprises a rear furrow wheel means 21 and an auxiliary transport wheel means 22. The rear furrow wheel itself is indicated at 23 and is shown as generally of conventional construction, having a soil-penetrating narrow tread 24. The rear furrow wheel 23 is journaled on the downwardly and laterally outwardly extending spindle or axle 26 (FIG. 4). The axle 26 is disposed between a pair of fore-and-aft spaced apart plates 27 for generally vertical adjustment, as about a pivot 28, being held in adjusted positions by means of a bolt 31 disposable in selected openings 32. The plates 27 are secured to and generally form a part of a wheel frame means 33 (FIG. 4) that includes, in addition to the parts just mentioned, a generally vertically disposed U-shaped yoke 35 having upper and lower arms 36 and 37. These arms are apertured to receive a removable vertical pivot preferably in the form of a relatively large vertical pin or shaft 38 that extends through corresponding openings formed in the rear end of the bar 5. The lower arm 37 is extended, as at 37a (FIG. 5), and is apertured at 39 (FIGS. 3 and 5) to receive a lead-adjusting link 41 that is connected at its rear end to the arm section 37a and at its forward end to a lug or bracket 42 that is fixed to the bar 5 when, as shown in FIG. 5, the auxiliary transport wheel unit is omitted. The link 41 comprises telescopic parts adjustable for effective length by any suitable means, such as by a threaded engagement and a securing lock nut 44. Preferably, the bracket 42 has a plurality of openings 46, any one of which may be engaged with the associated end of the link 41 for the purpose of changing the rear furrow wheel 23 from operating position to a position accommodating transport in a direction extending longitudinally of the main frame 4. Adjusting the telescopic link 41 itself serves to increase or decrease the lead of the wheel 23 as may be necessary.

The transport wheel means 22 (FIGS. 1 and 4) is in the nature of an auxiliary attachment that may be supplied for the rear furrow wheel means 21 when the operator desires to have available the transport facilitating means that the attachment affords. Yet, according to this invention, when the auxiliary transport means is installed, it serves at all times as a part of the supporting means for the rear end of the main frame.

The transport wheel means 22 comprises a rubber tired transport wheel 51 that is journaled for rotation on axle means 52 that is carried at the rear end of the transport wheel support arm 53. The front portion of the arm 53, which preferably comprises a plate member folded to form a generally U-shaped part, is pivotally connected, as at 54, with a bracket 55 that is connected to and serves as a part of a transport yoke 56 that generally is of the same configuration as the rear furrow wheel yoke 35. The yoke 56 is disposed generally vertically and has upper and lower arms 57 and 58 that are apertured to receive the pivot 38 and spaced apart vertically so as to lie in overlapping relation with respect to the furrow wheel yoke arms 36 and 37.

As best shown in FIG. 1, the bracket 55 is fixed in upstanding relation with respect to the upper arm 57 in any suitable way, as by welding. An adjusting crank screw 64 is arranged to have abutting engagement with a swivel 65 that is carried at the upper end of the upstanding bracket 55. The other end of the crank screw 64 is threaded into a nut member 66 that is carried by the transport wheel arm 53 in any suitable way. While the transport wheel arm 53 and yoke 56 form the principal part of the transport wheel attachment that may be connected to or separated from the furrow wheel means 21, the transport wheel unit when connected with the furrow wheel unit becomes a rigid part thereof by virtue of attaching means that includes the arms 57 and 58 described above as overlapping the arms 36 and 37, and receiving the same pivot member 38. When the transport wheel unit is attached to the furrow wheel unit a pin 68 is disposed in the opening 39 in the arm 37a and in an opening 69 in an arm 71 that extends outwardly at a right angle from the arm 58 of the yoke 56. This rigidly interconnects the yokes or wheel brackets 33 and 55 for movement together about the common pivot 38, whereby the parts swing together as one about the rear end portion of the arm 5.

For normal disking operation, the transport wheel 51 is raised upwardly into an inoperative position as shown in FIG. 1. When it is desired to arrange the disk tiller for endwise transport, as along highways or the like, the pin 68 is removed from the openings 39 and 69 (FIG. 3), and then while the rear furrow wheel 23 carries the weight of the rear end of the tiller, the link 41 is changed in length or entirely disconnected, which makes it possible to swing the auxiliary transport wheel around until it is generally parallel with the main frame 2, which is the position shown in FIG. 4. The crank screw 64 is then operated to lower the transport wheel 22 into supporting position, which raises the rear furrow wheel 21 off the ground. Then, the latter is swung over toward the transport wheel, which is easy to do since the weight of the rear end is now carried on the transport wheel 22. Next, the pin 68 is inserted in the registering openings 39 and 69 in the overlapping arms 37a and 71 and the link 41 re-attached, the forward end being inserted in the forward-most opening 46 (FIG. 4) and the link adjusted lengthwise, if necessary. This not only locks the furrow wheel against accidental displacement during transport but also locks the transport wheel 22 in transport position.

When the auxiliary transport unit is not required, the furrow wheel yoke 33 is pivotally mounted on the pivot 38 in the usual way, but, as best shown in FIG. 5, a spacer 75 is placed between the bar 5 and the adjacent yoke arm 36 or 37.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore and desire to secure by Letters Patent is:

1. In a disk tiller having a frame, a rear wheel support structure therefor, comprising a generally vertically disposed U-shaped yoke arranged with its arms extending generally laterally of the frame in vertically spaced apart relation, said arms being apertured, a removable vertical pivot carried by said frame and disposed in said arm apertures, a laterally extending wheel-receiving section fixed to the lower arm of said yoke, a rear furrow wheel journaled on said section, a second generally vertically extending U-shaped yoke disposed generally rearwardly of said first yoke and arranged with its arms extending generally forwardly in overlapping relation with the arms of said first yoke and apertured to receive said vertical pivot, said yokes being separable when said pivot is removed, and a transport wheel carried by the rear portion of said second yoke.

2. The invention set forth in claim 1, further characterized by means rigidly interconnecting said yokes to cause them to swing together about said vertical pivot.

3. In a disk tiller having a frame, a rear wheel support structure therefor, comprising a generally vertically disposed U-shaped yoke arranged with its arms extending generally laterally of the frame in vertically spaced apart relation, said arms being apertured, a removable vertical pivot carried by said frame and disposed in said arm apertures, a laterally extending wheel-receiving section fixed to the lower arm of said yoke, a rear furrow wheel journaled on said section, a second generally vertically extending U-shaped yoke disposed generally rearwardly of said first yoke and arranged with its arms extending generally forwardly in overlapping relation with the arms of said first yoke and apertured to receive said vertical pivot, said yokes being separable when said pivot is removed, and a transport wheel carried by the rear portion of said second yoke, an upstanding bracket fixed rigidly to the rear portion of said second yoke and extending upwardly therefrom, a part pivotally connected with the lower portion of said upstanding bracket and extending rearwardly therefrom, means connecting the transport wheel on the rear portion of said part, and adjustable means connecting the upper portion of said upstanding bracket with the rear portion of said wheel carrying means.

4. In a disk tiller or the like, a generally horizontal main frame normally disposed generally diagonally relative to the line of travel of the implement in operation, said frame being disposable generally longitudinally of the line of travel during transport, rear wheel frame means connected for pivotal movement about a generally vertical axis to the rear portion of said main frame, a rear furrow wheel journaled on said rear-wheel frame means, a transport wheel frame also swingably connected with the rear portion of the main frame for displacement relative thereto and relative to the rear wheel frame means about the aforesaid vertical axis and including a transport wheel shiftable from an upper ground-clearing position to a ground engaging position below said rear furrow wheel, means connected with the main frame and the rear wheel frame means to lock the latter in a position disposing the rear furrow wheel at an horizontal angle relative to the main frame, said locking means including an arm on the rear wheel frame means and a link connected with the main frame and releasably connected with said last mentioned arm, an arm on the transport wheel frame releasably connected with said rear wheel frame arm, and means on the transport wheel frame arm to receive said link when the rear wheel frame arm is connected with the transport frame arm.

5. In a disk tiller having a frame, a rear wheel support structure therefor, comprising a rear wheel support frame including a member having a laterally extending wheel-receiving section extending generally laterally of the frame, a rear furrow wheel journaled on said section, means including a generally vertical pivot swingably connecting said member with said frame, a generally laterally extending arm fixed to said member, a transport wheel support detachably connected with said pivot and including a second generally laterally extending arm and a generally rearwardly disposed vertically swingable arm, a transport wheel carried by said latter arm, means interconnecting said laterally extending arms, and link means connected between said transport wheel arm and the tiller frame.

6. The invention defined in claim 5, further characterized by means connecting said link means with said first mentioned arm to lock the latter to the frame when the transport wheel support is detached from said pivot.

7. The invention set forth in claim 5, further characterized by both of said laterally extending arms being apertured, said link means being connected to the aperture in the rear wheel support arm when the transport wheel support is detached.

References Cited in the file of this patent

UNITED STATES PATENTS

| | | |
|---|---|---|
| 1,698,980 | Wilson | Jan. 15, 1929 |
| 2,457,397 | Richards | Dec. 28, 1948 |
| 2,779,261 | Northcote et al. | Jan. 29, 1957 |